(12) United States Patent
Terry et al.

(10) Patent No.: US 10,631,197 B2
(45) Date of Patent: Apr. 21, 2020

(54) COGNITIVE FLOW CONTROL BASED ON CHANNEL QUALITY CONDITIONS

(71) Applicant: Signal Trust for Wireless Innovation, Wilmington, DE (US)

(72) Inventors: Stephen E. Terry, Northport, NY (US); Yi-Ju Chao, Minnetonka, MN (US)

(73) Assignee: Signal Trust for Wireless Innovation, Wilmington, DE (US)

( * ) Notice: Subject to any disclaimer, the term of this patent is extended or adjusted under 35 U.S.C. 154(b) by 58 days.

(21) Appl. No.: 15/722,779

(22) Filed: Oct. 2, 2017

(65) Prior Publication Data

US 2018/0027446 A1 Jan. 25, 2018

Related U.S. Application Data

(63) Continuation of application No. 15/180,415, filed on Jun. 13, 2016, now Pat. No. 9,781,629, which is a
(Continued)

(51) Int. Cl.
*H04W 4/00* (2018.01)
*H04W 28/02* (2009.01)
(Continued)

(52) U.S. Cl.
CPC ....... *H04W 28/0289* (2013.01); *H04L 5/0057* (2013.01); *H04L 47/10* (2013.01);
(Continued)

(58) Field of Classification Search
None
See application file for complete search history.

(56) References Cited

U.S. PATENT DOCUMENTS 5,809,012 A * 9/1998 Takase ............... H04L 12/5602
370/229
5,854,873 A 12/1998 Mori et al.
(Continued)

FOREIGN PATENT DOCUMENTS

CN 1385047 12/2002
CN 1406006 3/2003
(Continued)

OTHER PUBLICATIONS

ETSI EN 301 344 Draft, GSM, "Digital Cellular Telecommunication Systems (Phase 2+); General Packet Radio Service (GPRS); Service Description; Stage 2," GSM 03.06 Draft V6.5.0, Release 1997.
(Continued)

*Primary Examiner* — Clemence S Han
(74) *Attorney, Agent, or Firm* — Volpe and Koenig, P.C.

(57) ABSTRACT

A system and method which improve the performance of a wireless transmission system by intelligent use of the control of the flow of data between a radio network controller (RNC) and a Node B. The system monitors certain criteria and, if necessary, adaptively increases or decreases the data flow between the RNC and the Node B. This improves the performance of the transmission system by allowing retransmitted data, signaling procedures and other data to be successfully received at a faster rate, by minimizing the amount of data buffered in the Node B. Flow control is exerted to reduce buffering in the Node B upon degradation of channel qualities, and prior to a High Speed Downlink Shared Channel (HS-DSCH) handover.

15 Claims, 2 Drawing Sheets

Related U.S. Application Data continuation of application No. 14/577,896, filed on Dec. 19, 2014, now Pat. No. 9,369,917, which is a continuation of application No. 13/755,700, filed on Jan. 31, 2013, now Pat. No. 8,942,200, which is a continuation of application No. 13/444,283, filed on Apr. 11, 2012, now Pat. No. 8,379,575, which is a continuation of application No. 10/431,897, filed on May 8, 2003, now Pat. No. 8,175,030.

(60) Provisional application No. 60/379,858, filed on May 10, 2002.

(51) Int. Cl.
| | |
|---|---|
| *H04L 12/801* | (2013.01) |
| *H04L 12/825* | (2013.01) |
| *H04L 12/835* | (2013.01) |
| *H04W 28/14* | (2009.01) |
| *H04W 72/12* | (2009.01) |
| *H04L 5/00* | (2006.01) |
| *H04W 92/12* | (2009.01) |

(52) U.S. Cl.
CPC .............. *H04L 47/14* (2013.01); *H04L 47/17* (2013.01); *H04L 47/26* (2013.01); *H04L 47/263* (2013.01); *H04L 47/30* (2013.01); *H04W 28/0278* (2013.01); *H04W 28/14* (2013.01); *H04W 72/1231* (2013.01); *H04W 72/1252* (2013.01); *H04W 72/1284* (2013.01); *H04W 92/12* (2013.01)

(56) References Cited

U.S. PATENT DOCUMENTS

| | | | |
|---|---|---|---|
| 6,028,855 | A | 2/2000 | Hirsch |
| 6,067,446 | A | 5/2000 | Persson et al. |
| 6,085,108 | A | 7/2000 | Knutsson et al. |
| 6,246,878 | B1 | 6/2001 | Wallentin |
| 6,430,620 | B1* | 8/2002 | Omura .................... H04L 47/10 709/203 |
| 6,728,233 | B1 | 4/2004 | Park et al. |
| 6,738,624 | B1 | 5/2004 | Aksentijevic et al. |
| 6,738,646 | B2 | 5/2004 | Miyoshi et al. |
| 6,760,590 | B2 | 7/2004 | Miyoshi et al. |
| 7,016,320 | B1 | 3/2006 | Petersson et al. |
| 7,177,371 | B1 | 2/2007 | Hudson et al. |
| 8,280,424 | B2 | 10/2012 | Sarkkinen et al. |
| 9,781,629 | B2* | 10/2017 | Terry .................... H04L 47/10 |
| 2001/0012279 | A1 | 8/2001 | Haumont et al. |
| 2001/0019537 | A1 | 9/2001 | Itai |
| 2001/0036820 | A1* | 11/2001 | Fong .................... H04L 47/10 455/403 |
| 2001/0040877 | A1 | 11/2001 | Love et al. |
| 2001/0050909 | A1 | 12/2001 | Taketsugu |
| 2002/0080719 | A1 | 6/2002 | Parkvall et al. |
| 2002/0154612 | A1* | 10/2002 | Massie .................... H04L 1/1809 370/329 |
| 2002/0167926 | A1* | 11/2002 | Lee .................... H04W 28/10 370/338 |
| 2003/0133429 | A1 | 7/2003 | Choi et al. |
| 2003/0020490 | A1 | 10/2003 | Gunnarson et al. |
| 2003/0214906 | A1 | 11/2003 | Hu et al. |
| 2003/0228876 | A1 | 12/2003 | Hwang |
| 2004/0009767 | A1 | 1/2004 | Lee et al. |
| 2004/0071108 | A1 | 4/2004 | Wigell et al. |
| 2004/0165554 | A1 | 8/2004 | Chao et al. |
| 2004/0203980 | A1 | 10/2004 | Das et al. |
| 2004/0213297 | A1 | 10/2004 | Isokangas et al. |
| 2005/0085251 | A1* | 4/2005 | Kaminski ............ H04L 1/0007 455/510 |
| 2005/0239435 | A1 | 10/2005 | Ikeda |
| 2006/0146749 | A1* | 7/2006 | Lundh .................... H04W 36/02 370/331 |
| 2006/0256745 | A1 | 11/2006 | Chao et al. |
| 2006/0268717 | A1 | 11/2006 | Kanterakis |
| 2007/0242631 | A1 | 10/2007 | Ho et al. |
| 2008/0171554 | A1 | 7/2008 | Chao et al. |
| 2012/0320867 | A1 | 12/2012 | Sarkkinen et al. |

FOREIGN PATENT DOCUMENTS

| | | |
|---|---|---|
| EP | 1 133 202 | 9/2001 |
| GB | 2 361 392 | 10/2001 |
| JP | 2001-036578 | 2/2001 |
| JP | 2001-358763 | 12/2001 |
| JP | 2003-533122 | 11/2003 |
| KR | 2001-0109758 | 12/2001 |
| TW | 300688 | 3/1997 |
| TW | 303570 | 4/1997 |
| WO | 00/76243 | 12/2000 |
| WO | 01/86826 | 11/2001 |

OTHER PUBLICATIONS

Samsung, "High Speed Mobile Data Service," Telecommunications Technology Association (Mar. 27, 2002).
Third Generation Partnership Project, "Technical Specification Group Radio Access Network; UTRAN Iub Interface NBAP Signalling (Release 1999)," 3GPP TS 25.433 V3.9.0 (Mar. 2002).
Third Generation Partnership Project, "Technical Specification Group Radio Access Network; UTRAN Iub Interface NBAP Signalling (Release 1999)," 3GPP TS 25.433 V3.13.0 (Mar. 2003).
Third Generation Partnership Project, "Technical Specification Group Radio Access Network; UTRAN Iub Interface NBAP Signalling (Release 4)," 3GPP TS 25.433 V4.4.0 (Mar. 2002).
Third Generation Partnership Project, "Technical Specification Group Radio Access Network; UTRAN Iub Interface NBAP Signalling (Release 4)," 3GPP TS 25.433 V4.8.0 (Mar. 2003).
Third Generation Partnership Project, "Technical Specification Group Radio Access Network; UTRAN Iub Interface NBAP Signalling (Release 5)," 3GPP TS 25.433 V5.0.0 (Mar. 2002).
Third Generation Partnership Project, "Technical Specification Group Radio Access Network; UTRAN Iub Interface NBAP Signalling (Release 5)," 3GPP TS 25.433 V54.0 (Mar. 2003).
Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).
Third Generation Partnership Project, "Technical Specification Group Radio Access Network; High Speed Downlink Packet Access (HSDPA); Overall Description; Stage 2 (Release 5)," 3GPP TS 25.308 V5.4.0 (Mar. 2003).
Third Generation Partnership Project, "Technical Specification Group Radio Access Network; MAC Protocol Specification (Release 1999)," 3GPP TS 25.321 v3.11.0 (Sep. 2002).
Third Generation Partnership Project, "Technical Specification Group Radio Access Network; MAC Protocol Specification (Release 1999)," 3GPP TS 25.321 v3.15.0 (Mar. 2003).
Third Generation Partnership Project, "Technical Specification Group Radio Access Network; MAC Protocol Specification (Release 4)," 3GPP TS 25.321 v4.4.0 (Mar. 2002).
Third Generation Partnership Project, "Technical Specification Group Radio Access Network; MAC Protocol Specification (Release 4)," 3GPP TS 25.321 v4.8.0 (Mar. 2003).
Third Generation Partnership Project, "Technical Specification Group Radio Access Network; MAC Protocol Specification (Release 5)," 3GPP TS 25.321 v5.0.0 (Mar. 2002).
Third Generation Partnership Project, "Technical Specification Group Radio Access Network; MAC Protocol Specification (Release 5)," 3GPP TS 25.321 v5.4.0 (Mar. 2003).
Third Generation Partnership Project, "Technical Specification Group Radio Access Network; Radio Resource Control (RRC); Protocol Specification (Release 1999)," 3GPP TS 25.331 V3.10.0 (Mar. 2002).

(56) References Cited

OTHER PUBLICATIONS

Third Generation Partnership Project, "Technical Specification Group Radio Access Network; Radio Resource Control (RRC); Protocol Specification (Release 4)," 3GPP TS 25.331 V4.4.0 (Mar. 2002).
Third Generation Partnership Project, "Technical Specification Group Radio Access Network; Radio Resource Control (RRC); Protocol Specification (Release 4)," 3GPP TS 25.331 V4.9.0 (Mar. 2003).
Third Generation Partnership Project, "Technical Specification Group Radio Access Network; Radio Resource Control (RRC); Protocol Specification (Release 5)," 3GPP TS 25.331 V5.0.0 (Mar. 2002).
Third Generation Partnership Project, "Technical Specification Group Radio Access Network; Radio Resource Control (RRC); Protocol Specification (Release 5)," 3GPP TS 25.331 V5.4.0 (Mar. 2003).
Third Generation Partnership Project, "Technical Specification Group Radio Access Network; Radio Resource Control (RRC); Protocol Specification (Release 1999)," 3GPP TS 25.331 V3.14.0 (Mar. 2003).
Third Generation Partnership Project, "Technical Specification Group Radio Access Network; UTRAN $I_{ub}$ Interface User Plane Protocols for Common Transport Channel Data Streams (Release 1999)," 3GPP TS 25.435 V3.10.0 (Mar. 2002).
Third Generation Partnership Project, "Technical Specification Group Radio Access Network; UTRAN $I_{ub}$ Interface User Plane Protocols for Common Transport Channel Data Streams (Release 4)," 3GPP TS 25.435 V4.4.0 (Mar. 2002).
Third Generation Partnership Project, "Technical Specification Group Radio Access Network; UTRAN $I_{ub}$ Interface User Plane Protocols for Common Transport Channel Data Streams (Release 4)," 3GPP TS 25.435 V4.50 (Sep. 2002).
Third Generation Partnership Project, "Technical Specification Group Radio Access Network; UTRAN $I_{ub}$ Interface User Plane Protocols for Common Transport Channel Data Streams (Release 5)," 3GPP TS 25.435 V5.0.0 (Mar. 2002).
Third Generation Partnership Project, "Technical Specification Group Radio Access Network; UTRAN $I_{ub}$ Interface User Plane Protocols for Common Transport Channel Data Streams (Release 5)," 3GPP TS 25.435 V5.4.0 (Mar. 2003).

* cited by examiner

COGNITIVE FLOW CONTROL BASED ON CHANNEL QUALITY CONDITIONS

CROSS REFERENCE TO RELATED APPLICATIONS

This application is a continuation of U.S. patent application Ser. No. 15/180,415, filed Jun. 13, 2016, which is a continuation of U.S. patent application Ser. No. 14/577,896, filed Dec. 19, 2014, which issued as U.S. Pat. No. 9,369,917 on Jun. 14, 2016, which is a continuation of U.S. patent application Ser. No. 13/755,700, filed Jan. 31, 2013, which issued as U.S. Pat. No. 8,942,200 on Jan. 27, 2015, which is a continuation of U.S. patent application Ser. No. 13/444,283, filed Apr. 11, 2012, which issued as U.S. Pat. No. 8,379,575 on Feb. 19, 2013, which is a continuation of U.S. patent application Ser. No. 10/431,897, filed May 8, 2003, which issued as U.S. Pat. No. 8,175,030 on May 8, 2012, which claims priority from U.S. Patent Application No. 60/379,858, filed May 10, 2002, which are incorporated by reference as if fully set forth.

FIELD OF INVENTION

The present invention relates to the field of wireless communications. More specifically, the present invention relates to the exertion of flow control for data transmissions between a radio network controller (RNC) and a Node B in a third generation (3G) telecommunication system.

BACKGROUND

A 3G Universal Terrestrial Radio Access Network (UTRAN) comprises several RNCs, each of which is associated with one or more Node Bs, and each Node B being further associated with one or more cells.

The 3G Frequency Division Duplex (FDD) and Time Division Duplex (TDD) modes typically use the RNC to distribute (i.e., buffer and schedule), data transmissions to at least one User Equipment (UE). However, for the high speed channels of a 3G cellular system, data is scheduled for transmission by the Node B. One of these high speed channels, for example, is the High Speed Downlink Shared Channel (HS-DSCH). Since data is scheduled by the Node B, it is necessary to buffer data in the Node B for transmission to the UE(s).

There are many scenarios where large amounts of data buffered in the Node B have a negative impact on the overall operation of the system. Several of these scenarios will be described hereinafter.

The first scenario is related to the retransmission mechanisms in 3G systems to achieve high reliability of end-to-end data transmissions. It would be understood by those of skill in the art that the transmission failure between the Node B and the UE could be due to many different reasons. For example, the Node B may have retried the transmission several times without success. Alternatively, the transmission time allotted for a particular transmission may have expired. The present invention which will be described in further detail hereinafter is intended to cover both these situations and any other situations where the failure of a data transmission necessitates a radio link control (RLC) retransmission.

There are many levels of retransmission mechanisms. One mechanism, for example, is the retransmissions of the Hybrid Automatic Repeat Request (H-ARQ) process for High Speed Downlink Packet Access (HSDPA). The H-ARQ process provides a mechanism where transmissions that are received in error are indicated to the transmitter, and the transmitter retransmits the data until the data is received correctly.

In addition to the H-ARQ process, there are entities in the RNC and the UE. The sending RLC entity signals a sequence number (SN) in the header of a particular protocol data unit (PDU) which is used by the receiving RLC entity to ensure that no PDUs are missed in the transmission. If there are PDUs missed during the transmission, as realized by an out-of-sequence delivery of PDUs, the receiving RLC entity sends a status report PDU to inform the sending RLC entity that certain PDUs are missing. The status report PDU describes the status of successful and/or unsuccessful data transmissions. It identifies the SNs of the PDUs that are missed or received. If a PDU is missed, the sending RLC entity will retransmit a duplicate of the missed PDU to the receiving RLC entity.

The impact of retransmissions in system performance will be described with reference to FIG. 1. As shown, when the PDU with SN=3 is not received successfully by the UE, the RLC within the UE requests its peer entity in the RNC for a retransmission. In the interim, the PDUs with SNs=6 and 7 are queued in the buffer of the Node B.

Referring to FIG. 2, since the retransmission process takes a finite amount of time and data is continuing to be transmitted, two more PDUs with SNs=8 and 9 have queued up behind the PDUs with SNs=6 and 7, and in front of the retransmitted PDU with SN=3. The PDU with SN=3 will have to wait until the PDUs with SNs=6-9 have been transmitted to the UE. Additionally, due to the requirement of in-sequence delivery of data to higher layers, the PDUs with SNs=4-9 will not be passed through higher layers until the PDU with SN=3 is received and in-sequence delivery of data can be performed.

The UE will be required to buffer the out-of-sequence data until the missing PDU can be transmitted. This not only results in a delay of the transmission, but requires the UE to have a memory capable of data buffering for continuous data reception until the missed data can be successfully retransmitted. Otherwise, the effective data transmission rate is reduced, thereby affecting quality of service. Since memory is very expensive, this is an undesirable design constraint. Accordingly, this first scenario is when there is a need for RLC retransmission and a large amount of data buffered in the Node B results in a larger data retransmission delay and higher UE memory requirements.

A second scenario when the buffering of data in the Node B negatively affects system performance is in the case that layer 2 (L2) or layer 3 (L3) messages and data transmissions are processed by the same scheduling processes or share a single buffer in the Node B. While data is being buffered and processed and an L2/L3 message comes behind it, the message cannot circumvent the transmission queue. The greater the amount of data within a transmission buffer, (which operates as first-in-first-out (FIFO) buffer), the longer it takes for an L2/L3 message or data to get through the buffer. Any higher priority L2/L3 messages are thus delayed by the data in the buffers.

A third scenario where the buffering of data in the Node B could negatively impact the performance of the system is in the event of a serving HS-DSCH cell change. Since the Node B performs scheduling and buffering of data for an HS-DSCH, when the UE performs a serving HS-DSCH cell change from a source Node B to a target Node B, there is a possibility that considerable amounts of data may still be buffered in the source Node B after the handover. This data is not recoverable because there is no mechanism that exists within the UTRAN architecture for data buffered as the source Node B to be transmitted to the target Node B. Upon a serving HS-DSCH cell change, the RNC has no information regarding how much, if any, data is lost since the RNC it does not know what data is buffered in the source Node B. The greater the amount of data that is buffered in the Node B in the event of an HS-DSCH cell change, the greater the amount of data which will ultimately be stranded in the source Node B and will have to be retransmitted.

Accordingly, it would be desirable for the aforementioned reasons to limit the amount of data that is buffered in the Node B.

SUMMARY

The present invention is a system and method which improve the performance of a wireless transmission system by intelligent use of the control of the flow of data between the RNC and the Node B. The system monitors certain criteria and, if necessary, adaptively increases or decreases the data flow between the RNC and the Node B. This improves the performance of the transmission system by allowing retransmitted data, signaling procedures and other data to be successfully received at a faster rate than in prior art systems, by minimizing the amount of data buffered in the Node B. Flow control is exerted to reduce buffering in the Node B upon degradation of the channel quality, and prior to an HS-DSCH handover.

In a preferred embodiment, the present invention is implemented in a wireless communication system including a radio network controller (RNC) in communication with a Node B having at least one buffer therein for storing data. The RNC signals the Node B with a request that the RNC send a certain amount of data to the Node B. The Node B monitors a selected quality indicator and calculates a capacity allocation for the buffer based on the selected quality indicator. The Node B signals the capacity allocation to the RNC. In response to receipt of the capacity allocation, the RNC transmits data to the Node B at a data flow rate determined in accordance with the capacity allocation and at least one predetermined criterion. The Node B adjusts the buffer accordingly.

BRIEF DESCRIPTION OF THE DRAWING(S)

A more detailed understanding of the invention may be had from the following description, given by way of example and to be understood in conjunction with the accompanying drawings wherein.

Figure 3A:
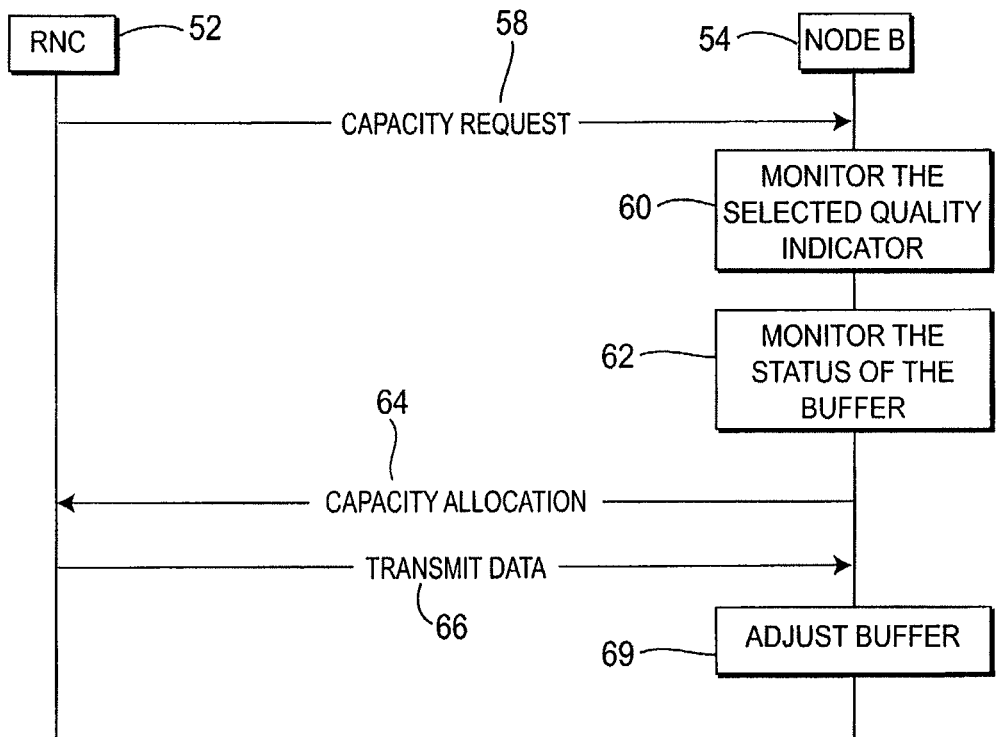
Figure 3B:
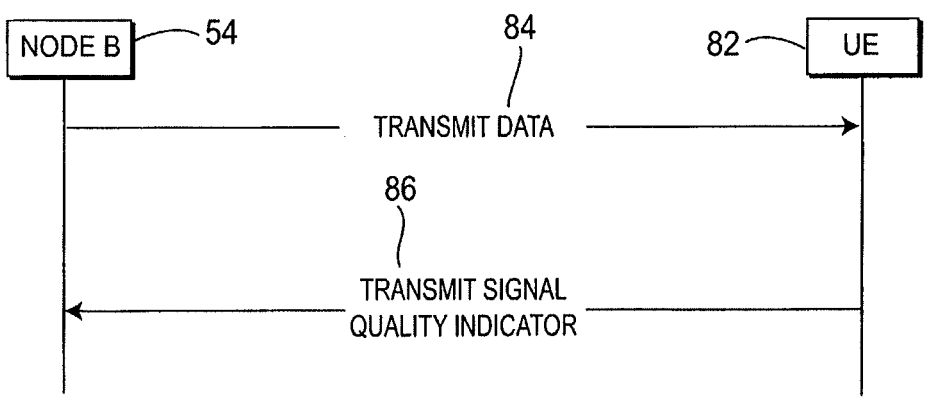

FIGS. 3A and 3B, taken together, are a method in accordance with the present invention for monitoring the channel quality and adjusting the flow of data between the RNC and the Node B.

Figure 4:
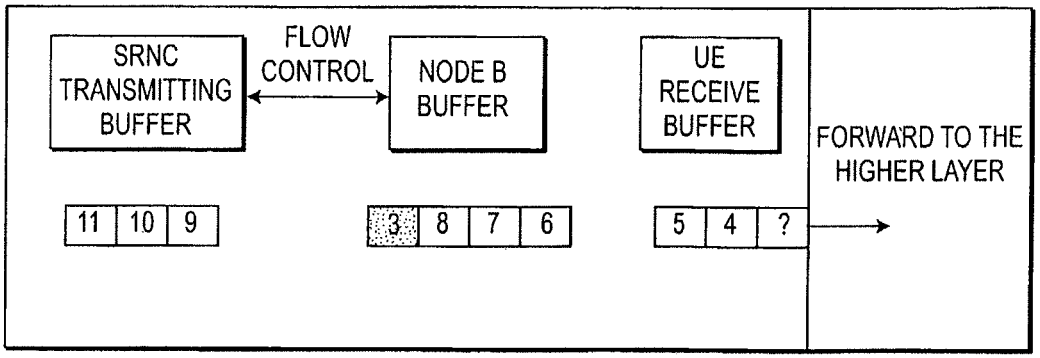

FIG. 4 is the buffering of data in the RNC, the Node B and the UE in the event of a retransmission using the method of FIGS. 3A and 3B.

DETAILED DESCRIPTION OF THE PREFERRED EMBODIMENT(S)

The present invention will be described with reference to the drawing figures wherein like numeral represent like elements throughout. Although the present invention will be described by referring to a specific number of PDUs being queued in a buffer (such as ten PDUs), this number of PDUs is referred to only for simplicity. The actual number of PDUs which is being transmitted and buffered in accordance with the aforementioned scenarios is more likely on the order of several hundred PDUs or more. The present invention and the teachings herein are intended to be applicable to any number of PDUs and any size transmission buffer.

In general, the present invention reduces the flow of data to the Node B for a UE when there is a degradation of channel quality of the UE, and increases the flow of data to the Node B when there is an improvement in channel quality of the UE. In order to control the flow of the transmission of data between the RNC and the Node B, the present invention monitors one or more parameters for channel quality. This flow control can be based on one criterion, or a combination of many different criteria. Additionally, as will be explained in detail hereinafter, the criterion may be internally-generated by the Node B, or may be generated by an external entity, (such as the UE), and sent to the Node B.

Referring to FIG. 3A, a method 50 in accordance with the present invention for monitoring the quality of a communication channel and adjusting the flow of data between the RNC 52 and the Node B 54 is shown. This method 50 handles the transmission of data between the RNC 52 and the Node B 54. The RNC 52 transmits a capacity request to the Node B 54 (step 58). The capacity request is basically a request from the RNC 52 to the Node B 54 that the RNC 52 would like to send a certain amount of data to the Node B 54. The Node B 54 receives the capacity request and monitors the selected quality indicator (step 60). This selected quality indicator may be based upon data transmitted from the UE (as will be described in detail hereinafter), or may be based upon an internally-generated quality indicator, such as the depth of the buffer in the Node B 54.

The Node B 54 also monitors the status of the buffer within the Node B (step 62). As would be understood by those with skill in the art, although the present invention is described with reference to a single buffer within the Node B 54 for simplicity, most likely the buffer comprises a plurality of buffers or a single buffer segmented into a plurality of sub-buffers, each buffer or sub-buffer being associated with one or more data flows. Regardless of whether there is one or more multiple buffers, an indicator which indicates the amount of data within the buffer is generated internally within the Node B. This permits the Node B 54 to monitor the amount of data within the buffer, and also to monitor the amount of additional data the buffer may accept.

The Node B 54 calculates and transmits a capacity allocation (step 64) to the RNC 52. The capacity allocation is an authorization by the Node B 54 to permit the RNC 52 to transmit a certain amount of data. The RNC 52, upon receiving the capacity allocation, transmits the data in accordance with the allocation (step 66). That is, the RNC 52 sends data to the Node B 54, the amount of which may not exceed the capacity allocation. The Node B then adjusts its buffer accordingly to receive and store the data (step 69). The amount of data stored in the buffer will change in accordance with the incoming data that is transmitted from the RNC 52 and the outgoing data that is transmitted to the UE 82 (shown in FIG. 3b).

It would be appreciated by those of skill in the art that the method 50 shown in FIG. 3A is constantly repeated as data flows from the RNC 52 to the Node B 54, and as the flow rate is continually adjusted by the Node B 54. It should also be noted that method steps 58, 60, 62, 64, 66 and 69 are not necessarily performed in sequence, and any one step may be applied multiple times before a different step in method 50 is applied. Additionally, some of the steps, such as the capacity allocation step 64, may indicate a repetitive data allocation that allows for the transmission of data (step 66) to be periodically implemented.

Referring to FIG. 3B, a method 80 in accordance with the present invention for monitoring the quality of a communication channel between the Node B 54 and a UE 82 is shown. The Node B 54 transmits data to the UE 82 (step 84). The UE 82 receives the data and transmits a signal quality indicator (step 86) such as the channel quality index (CQI) to the Node B 54. This signal quality indicator may then be used as the selected quality indicator in step 60 of FIG. 3A.

It would be noted by those of skill in the art that steps 84 and 86 are not necessarily sequential in practice. For example, in the FDD mode, signal quality indicators are periodically sent from the UE 82 regardless of whether or not a data is transmitted. In such a case, the UE 82 transmits a signal quality indicator either periodically or in response to a specific event to the Node B 54. This signal quality indicator may then be used as selected quality indicator in step 60 of FIG. 3A.

As aforementioned, the selected quality indicator may be internally generated by the Node B, or externally generated by another entity such as the UE and sent to the Node B. In accordance with a first embodiment, the criterion is the channel quality feedback from the UE. In this embodiment, the CQI which is an indicator of the downlink channel quality is used.

In a second embodiment, the criterion is the ACK or NACK that the UE produces in accordance with the H-ARQ process. For example, the number of ACKs and/or the number of NACKs over a certain time period can be used to derive an indication of the quality of the channel.

In a third embodiment, the criterion is the choice by the Node B of the modulation and coding set (MCS) that is needed to successfully transmit data. As would be understood by those of skill in the art, a very robust MCS is used when channel conditions are poor. Alternatively, a less robust MCS may be utilized when the channel conditions are good and a large amount of data may be transmitted. The choice of the most robust MCS set may be utilized as an indicator of poor channel quality conditions, whereas the use of the least robust MCS may signify that channel quality conditions are favorable.

In a fourth embodiment, the criterion is the depth of the queue inside the Node B transmission buffer(s). For example, if the Node B 54 buffer is currently storing a large amount of data, it is an indicator that channel quality conditions may be poor since the data is "backing up" in the Node B buffer. A buffer which is lightly loaded may be an indicator that channel quality conditions are good and the data is not backing up.

In a fifth embodiment, the criterion is the amount of data that is "dropped" in the Node B. As understood by those of skill in the art, the dropped data is data which the Node B has attempted to retransmit several times and has given up after a predetermined number of retries. If a large number of transmissions are dropped by the Node B, it is an indicator that channel quality conditions are poor.

In a sixth embodiment, the criterion is the amount of data that can be transmitted by the Node B within a predetermined duration, such as one hundred milliseconds. Depending upon the quality of a communication channel, the number of PDUs that are buffered in the Node B may change. Although the predetermined duration may be fixed, due to changing channel quality conditions the amount of PDUs that may be transmitted within the predetermined duration may change dramatically. For example, if channel quality conditions are good, a hundred PDUs may be able to be transmitted within a hundred millisecond duration; whereas if channel quality conditions are very poor, only ten PDUs may be able to be transmitted within the hundred second duration.

It should be understood by those of skill in the art that other criteria which may directly or indirectly indicate the condition of the channel may be utilized in accordance with the present invention. Additionally, a combination of two or more of the above-described criteria may be utilized or weighted accordingly, depending upon the specific needs of the system users.

Figure 1:
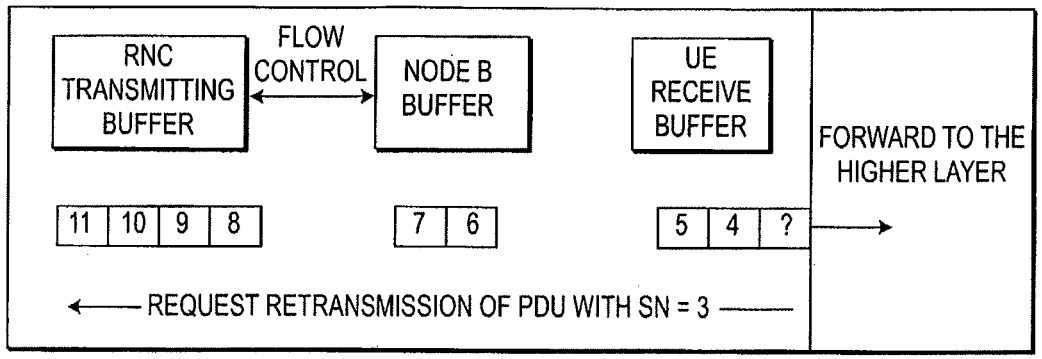
FIG. 1 shows prior art buffering of data in the RNC, the Node B and the UE.
Figure 2:
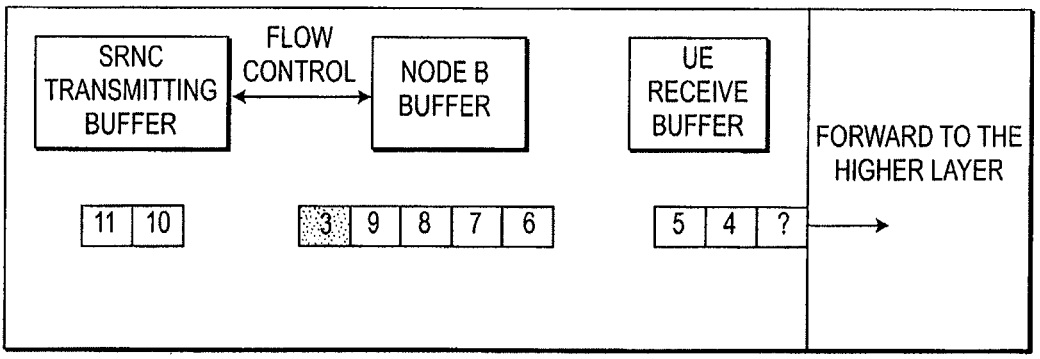
FIG. 2 shows prior art buffering of data in the RNC, the Node B and the UE in the event of a retransmission.

Referring to FIG. 4, the benefits of adaptively controlling the flow of data between the RNC and the Node B can be seen. This example is the scenario where a retransmission is required due to a failed transmission and the flow of data between the RNC and the Node B is decreased. As a result of the data flow decrease, only one additional PDU with SN=8 is queued in front of the retransmitted PDU with SN=3. The exertion of flow control as shown in FIG. 4 reduces the latency of the retransmission of the PDU with SN=3 as compared to the prior art handling of retransmissions as shown in FIG. 2 where the PDUs with SNs=8 and are queued in front of the PDU with SN=3. Therefore, the PDU with SN=3 can be retransmitted to the UE earlier. The in-sequence delivery requirement results in faster processing and delivery of PDUs 4 through 8 to higher layers.

While the present invention has been described in terms of the preferred embodiment, other variations which are within the scope of the invention as outlined in the claims below will be apparent to those skilled in the art.

What is claimed is:

1. A method of operating a wireless communication system including a Node-B controlled by a radio network controller (RNC), the method comprising:
   determining, by the Node-B, a loss of data;
   determining, by the Node-B, an amount of data that at least one buffer in the Node-B may accept; and
   transmitting, by the Node-B to the RNC, a capacity allocation message, the capacity allocation message being derived from the determined amount of data and the determined loss of data.

2. The method of claim 1, further comprising receiving, at the Node-B from the RNC, an amount of data equal to or less than the capacity allocation.

3. The method of claim 1, further comprising transmitting, by the RNC to the Node-B, an amount of data equal to or less than the capacity allocation.

4. The method of claim 1, further comprising:
   determining a back-up, wherein the capacity allocation message is further derived from the determined back-up.

5. The method of claim 1, wherein the at least one buffer comprises a plurality of buffers or sub-buffers.

6. The method of claim 1, wherein the capacity allocation is further based on a selected quality indicator.

7. The method of claim 6, wherein the selected quality indicator is received from a wireless transmit/receive unit (WTRU).

8. The method of claim 1, further comprising:
   receiving, at the Node-B from the RNC, a capacity request indicating an amount of data that the RNC has available to send to the Node B, wherein the capacity allocation is transmitted by the Node-B to the RNC in response to the received capacity request.

9. A Node-B comprising:
a processor;
a transceiver;
at least one buffer; and
wherein the processor is configured to:
   determine a loss of data;
   determine an amount of data that the at least one buffer may accept; and
   cause the transceiver to transmit a capacity allocation message to a radio network controller (RNC), the capacity allocation message being derived from the determined amount of data and the determined loss of data.

10. The Node-B of claim 9, wherein the transceiver is configured to receive, from the RNC, an amount of data equal to or less than the capacity allocation.

11. The Node-B of claim 9, wherein the processor is further configured to determine a back-up, wherein the capacity allocation message is further derived from the determined back-up.

12. The Node-B of claim 9, wherein the at least one buffer comprises a plurality of buffers or sub-buffers.

13. The Node-B of claim 9, wherein the capacity allocation is further based on a selected quality indicator.

14. The Node-B of claim 13, wherein the selected quality indicator is received from a wireless transmit/receive unit (WTRU).

15. The Node-B of claim 9, wherein the transceiver is further configured to:
   receive, from the RNC, a capacity request indicating an amount of data that the RNC has available to send to the Node B, wherein the capacity allocation is transmitted by the Node-B to the RNC in response to the received capacity request.

* * * * *